US009625804B2

United States Patent
Kim et al.

(10) Patent No.: US 9,625,804 B2
(45) Date of Patent: Apr. 18, 2017

(54) PROJECTOR CLUSTERING METHOD, AND MANAGEMENT DEVICE AND MANAGEMENT SYSTEM USING THEREOF

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 150 days.

(21) Appl. No.: 14/453,429

(22) Filed: Aug. 6, 2014

(65) Prior Publication Data

US 2015/0055099 A1 Feb. 26, 2015

(30) Foreign Application Priority Data

Aug. 26, 2013 (KR) .................. 10-2013-0101340

(51) Int. Cl.
G03B 21/00 (2006.01)
G03B 37/04 (2006.01)
H04N 9/31 (2006.01)
G03B 21/13 (2006.01)

(52) U.S. Cl.
CPC .......... *G03B 37/04* (2013.01); *H04N 9/3147* (2013.01); *H04N 9/3185* (2013.01); *H04N 9/3194* (2013.01); *G03B 21/13* (2013.01)

(58) Field of Classification Search
CPC ........ G03B 21/00; G03B 21/14; G09G 3/001; H04N 5/74; H04N 9/31
USPC .............................. 353/31, 70, 94, 122, 74
See application file for complete search history.

(56) References Cited

U.S. PATENT DOCUMENTS

| 7,889,952 B2* | 2/2011 | Miyazawa | H04N 9/3185 353/30 |
| 2008/0100805 A1* | 5/2008 | Majumder | G03B 21/26 353/30 |
| 2009/0073393 A1* | 3/2009 | Lee | G03B 21/00 353/94 |

FOREIGN PATENT DOCUMENTS

| JP | 09-326981 A | 12/1997 |
| JP | 2000059806 A | 2/2000 |
| JP | 2006109035 A | 4/2006 |
| JP | 2006-287963 A | 10/2006 |
| JP | 2007-079028 A | 3/2007 |
| JP | 2008-249908 A | 10/2008 |
| JP | 2009-077167 A | 4/2009 |
| JP | 2012517621 A | 8/2012 |
| KR | 100750955 B1 | 8/2007 |
| KR | 1020090090682 A | 8/2009 |

OTHER PUBLICATIONS

Korean Office Action for application No. 10-2013-0101340 dated Aug. 25, 2014.
International Search Report for PCT/KR2014/007573 dated Oct. 17, 2014.
Japanese Office Action.

* cited by examiner

*Primary Examiner* — Steven H Whitesell Gordon
*Assistant Examiner* — Jerry Brooks
(74) *Attorney, Agent, or Firm* — Hauptman Ham, LLP (57) ABSTRACT

The present invention relates to a projector clustering method including the steps of: (a) arranging projection areas of a plurality of projectors to be overlapped with each other; (b) setting a reference projector among the plurality of projectors; and (c) calculating relative transformation information between the reference projector and the other projectors.

11 Claims, 9 Drawing Sheets ex> Reference projector : Projector 1 (Projection area 1)

- Reference projector (Projector 1) ↔ Projector 2 : H (1→2)
  H (2→1)

- Reference projector (Projector 1) ↔ Projector 3 : H (1→3) = H (1→2) · H (2→3)
  H (3→1) = H (3→2) · H (2→1)

Projection area 1: Area projected by projector 1
Projection area 2: Area projected by projector 2
Projection area 3: Area projected by projector 3

Fig. 3 ex> Reference projector : Projector 1 (Projection area 1)

$\Big\{$ · Reference projector (Projector 1) ↔ Projector 2 : H (1→2)
$\qquad$ H (2→1)

· Reference projector (Projector 1) ↔ Projector 3 : H (1→3) = H (1→2) · H (2→3)
$\qquad$ H (3→1) = H (3→2) · H (2→1)

Non-rectangular projection area

PROJECTOR CLUSTERING METHOD, AND MANAGEMENT DEVICE AND MANAGEMENT SYSTEM USING THEREOF

CROSS REFERENCE TO RELATED APPLICATION

This application claims the priority of Korean Patent Application No. 10-2013-0101340, filed on Aug. 26, 2013 in the KIPO (Korean Intellectual Property Office), which is incorporated herein by reference in its entirety.

TECHNICAL FIELD

The present invention relates to a projector clustering method, and more specifically, to a technique of clustering and managing a plurality of projectors based on relative transformation information among the plurality of projectors.

BACKGROUND ART

Techniques for implementing an image using a plurality of projectors are developed to provide an audience with a three-dimensional and highly realistic experience. For example, projection techniques such as a technique of implementing an image of a large screen by combining images projected by a plurality of projectors, a technique of implementing an image on a plurality of projection surfaces using images projected by a plurality of projectors and the like are developed.

When an image is implemented using a plurality of projectors like this, a technique of controlling and managing the plurality of projectors is prerequisite, and, specifically, a technique of allocating image areas to a plurality of projectors, a technique of correcting projection images of the plurality of projectors and the like should be implemented essentially.

Meanwhile, conventionally, a method of individually controlling and managing each projector is used in the process of controlling and managing a plurality of projectors. That is, a method of separately creating and managing projection image correction information (masking information, edge blending information, warping information and the like), image area allocation information and the like for each projector included in the plurality of projectors has been used.

However, if information on a projector is erroneously set, such a conventional method may generate a problem in the process of creating data for the other projectors, and although generation of an error is recognized in the process of a work, it is very difficult to correct the error. In addition, the same operation should be redundantly performed on each projector, and the amount of data to be managed increases exponentially as the number of projectors increases. In addition, when an image related to projection areas of two or more projectors is corrected, it is difficult to guarantee quality of the correction.

DISCLOSURE OF INVENTION

Technical Problem

Therefore, the present invention has been made in view of the above problems, and it is an object of the present invention to provide a method of clustering and managing a plurality of projectors when an image is implemented using the plurality of projectors.

Another object of the present invention is to provide a method of managing a plurality of clustered projectors based on relative transformation information among the plurality of projectors.

Technical Solution

To accomplish the above objects, according to one aspect of the present invention, there is provided a projector clustering method including the steps of: (a) arranging projection areas of a plurality of projectors to be overlapped with each other; (b) setting a reference projector among the plurality of projectors; and (c) calculating relative transformation information between the reference projector and the other projectors.

In addition, at step (a), projection areas of adjacent projectors are overlapped in a rectangular shape.

In addition, step (c) includes the steps of: (c-1) setting relative transformation information of the adjacent projectors; and (c-2) calculating the relative transformation information between the reference projector and the other projectors based on the information set at step (c-1).

In addition, the projector clustering method further includes the step of (d) calculating relative transformation information between the reference projector and an image area.

In addition, the projector clustering method further includes the step of (e) calculating relative transformation information between the image area and the other projectors based on the relative transformation information between the reference projector and the other projectors and the relative transformation information between the reference projector and the image area.

In addition, a correspondence relation between a pixel included in the image area and a pixel included in a projection area of a specific projector can be calculated based on relative transformation information between the image area and the specific projector.

In addition, if the projection area of the specific projector is not in a rectangular shape, a reference area of a rectangular shape is set using a maximum value and a minimum value of the projection area, and a position of a pixel included in the projection area is expressed based on the set reference area.

In addition, the plurality of projectors is a cluster projecting together an image on a specific projection surface among projection surfaces of a multi-projection theater.

Meanwhile, the projector clustering method according to an embodiment of the present invention can be stored, after being programmed, in a recording medium that can be recognized by an electronic device.

According to another aspect of the present invention, there is provided a management device for clustering and managing a plurality of projectors, the device including: a transformation information calculation unit for calculating relative transformation information between a reference projector and the other projectors while projection areas of the plurality of projectors are overlapped; and a storage unit for storing the transformation information calculated by the transformation information calculation unit as a database.

In addition, the transformation information calculation unit calculates the transformation information while projection areas of adjacent projectors are overlapped in a rectangular shape.

In addition, the transformation information calculation unit calculates relative transformation information between the reference projector and an image area.

In addition, the transformation information calculation unit calculates relative transformation information between the image area and the other projector based on the relative transformation information between the reference projector and the other projectors and the relative transformation information between the reference projector and the image area.

In addition, the plurality of projectors is a cluster projecting together an image on a specific projection surface among projection surfaces of a multi-projection theater.

According to another aspect of the present invention, there is provided a projector management system for clustering and managing a plurality of projectors, the system including: the plurality of projectors for projecting together an image on a specific projection surface; and a management device for calculating relative transformation information between a reference projector and the other projectors while projection areas of the plurality of projectors are overlapped.

Advantageous Effects

The present invention may cluster and manage a plurality of projectors. Specifically, after clustering a plurality of projectors, the present invention may perform a work such as allocation of an image area, correction of a projection image and the like by the unit of cluster. Accordingly, compared with a conventional technique of allocating or correcting an image for each individual projector, information on the projectors can be systematically managed, and accuracy of image allocation and image correction can be improved. In addition, an error generated in the image correction process can be easily corrected, and the image correction work can be collectively performed on the plurality of projectors.

Furthermore, the present invention may cluster a plurality of projectors based on relative transformation information of the plurality of projectors. Specifically, the present invention may cluster a plurality of projectors based on the relative transformation information (e.g., homography information or the like) of the plurality of projectors. Accordingly, the present invention may perform collective image allocation or image correction on the plurality of clustered projectors based on the transformation information.

Furthermore, after setting a reference projector, the present invention may easily manage image information of a plurality of projectors based on relative transformation information between the reference projector and the other projectors. For example, after setting image area allocation information of the reference projector, the present invention may automatically set image area allocation information of the other projectors based on the relative transformation information between the reference projector and the other projectors.

Furthermore, the present invention may cluster a plurality of projectors while projection areas of the plurality of projectors are overlapped in a rectangular shape. Accordingly, the present invention may easily calculate relative transformation information of a plurality of projectors, and an overlapped projection area can be easily calculated and utilized in a correction process.

DESCRIPTION OF SYMBOLS

100: Projector
200: Management device
210: Transformation information calculation unit
220: Storage unit
230: Projector operation management unit
240: Communication unit
250: User interface unit
260: Camera unit
270: Control unit Best Mode for Carrying out the Invention Hereinafter, a 'projector clustering method, and a management device and system using thereof' according to embodiments of the present invention will be described in detail with reference to the accompanying drawings. The described embodiments are provided to make the technical spirits of the present invention easily understood by those skilled in the art, and the present invention is not limited thereby. In addition, the elements expressed in the accompanying drawings are figures drawn to easily explain the embodiments of the present invention and may be different from actually implemented forms.

Meanwhile, the components expressed below are merely examples for implementing the present invention. Accordingly, other components can be used in other implements of the present invention without departing from the spirits and scope of the present invention. In addition, although each component can be implemented only in a pure hardware or software configuration, it also can be implemented by combining various hardware or software configurations performing the same function.

In addition, the expression of 'including' an element is an 'expression of an open type' which merely refers to existence of a corresponding component, and it should not be construed as precluding additional components.

A projector clustering method according to an embodiment of the present invention described below may cluster a plurality of projectors into clusters and manage the plurality of projectors (allocate an image area or correct an image) by the unit of cluster based on relative transformation information among the plurality of projectors.

In addition, the projector clustering method according to an embodiment of the present invention described below can be implemented through a connection operation of various kinds of hardware or software. For example, the present invention can be implemented through a connection operation of a plurality of projectors and a server device wiredly or wirelessly connected to the plurality of projectors, and, other than this connection, it can be implemented by a connection operation of various kinds of hardware or software.

Hereinafter, a projector clustering method according to an embodiment of the present invention will be described with reference to FIGS. 1 to 6.

Figure 1:
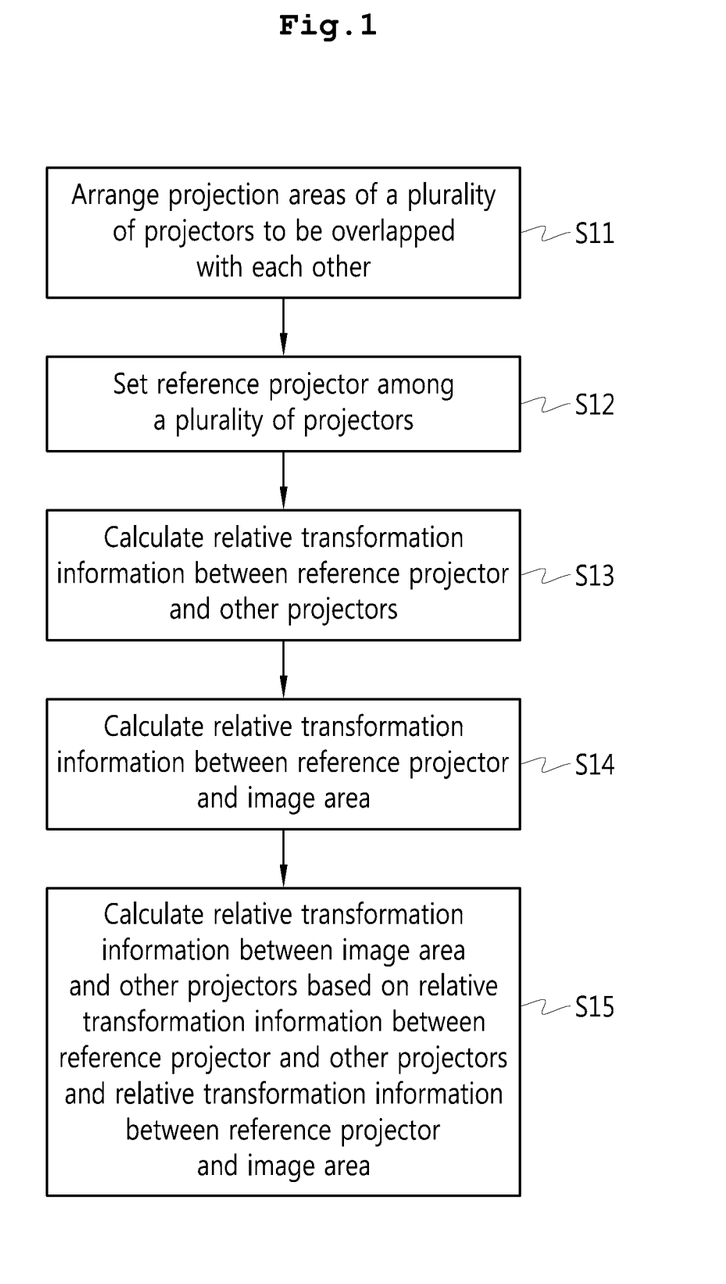
FIG. 1 is a flowchart illustrating a projector clustering method according to an embodiment of the present invention.

Referring to FIG. 1, a projector clustering method according to an embodiment of the present invention may include the steps of arranging projection areas of a plurality of projectors to be overlapped with each other S11, setting a reference projector among the plurality of projectors S12, and calculating relative transformation information between the reference projector and the other projectors S13.

Figure 2:
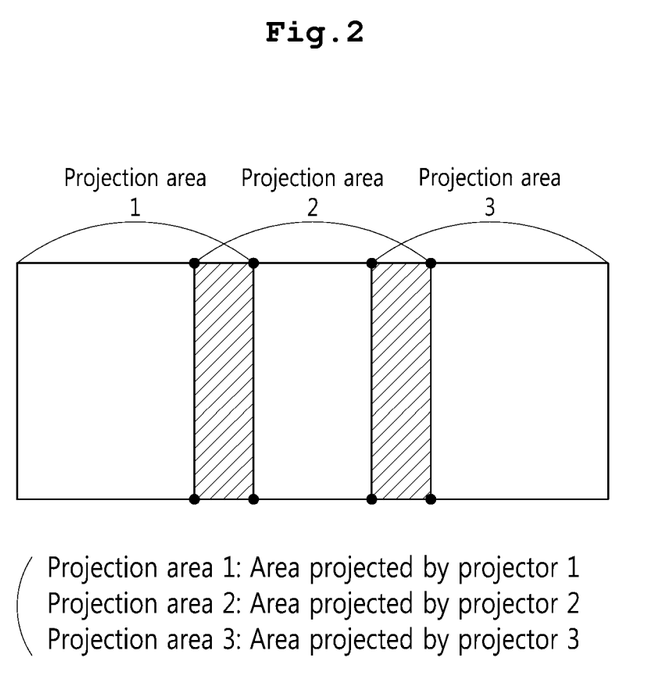
FIG. 2 is a view showing an example of arranging projection areas of a plurality of projectors to be overlapped with each other.

Step S11 is a step of aligning projection areas of the plurality of projectors to be clustered. Here, preferably, the plurality of projectors is arranged to overlap projection areas of adjacent projectors as shown in FIG. 2. In order to cluster and manage the plurality of projectors by the unit of cluster, it should be possible to calculate the relative transformation information among the plurality of projectors since the relative transformation information among the plurality of projectors can be calculated based on the information on the overlapped projection areas.

In addition, the projection areas of the adjacent projectors are overlapped preferably in a rectangular shape as shown in FIG. 2. At least four or more pieces of point correspondence information are needed to calculate the relative transformation information among the projectors since the point correspondence information can be easily calculated if the projection areas of the projectors are overlapped in a rectangular shape. In addition, if an overlapped projection area is formed in a rectangular shape, correction (edge blending correction, black offset correction or the like) on the overlapped area can be easily performed since the overlapped projection area can be clearly specified.

For reference, although the projection areas of the plurality of projectors are configured in a rectangular shape, the projection areas of the plurality of projectors are not limited to such a rectangular shape. The projection areas of the plurality of projectors can be configured in a variety shapes, such as a trapezoid, a parallelogram, a general triangle and the like according to a projection environment.

Meanwhile, step S11 can be performed based on 1) information created by an image sensing device such as a camera device or the like or 2) information input through a user interface and can be performed through a variety of ways other than these methods. In the former case, the image sensing device may recognize an arrangement state of the projection areas of the plurality of projectors, and the projection areas of the plurality of projectors can be arranged to be overlap with each other by adjusting direction of projection of the plurality of projectors based on the information recognized by the image sensing device. In the latter case, the projection areas of the plurality of projectors can be arranged to be overlap with each other based on the information input through the user interface, and, here, functions for easily confirming the overlapped projection areas of adjacent projectors through the user interface can be additionally implemented. For example, a function of displaying only the projection areas of currently controlled two adjacent projectors and not displaying projection areas of the other projectors through the user interface, a function of displaying projection areas of adjacent projectors in colors different from each other (e.g., blue, red and the like), and a function of visually displaying correspondence points of the overlapped areas and the like can be implemented.

In addition, step S11 may be performed based on information created by a sensing device (e.g., a gyroscope) which senses physical positions of projectors. For example, the sensing device may sense physical positions of a plurality of projectors and adjust the projection area of each projector based on the sensed physical positions, and the projection areas of the plurality of projectors may be arranged to be overlapped with each other through this operation.

Step S12 is a step of setting a reference projector among the plurality of clustered projectors.

Here, a projector set as the reference projector is not limited by a special condition, but may be freely set among the plurality of projectors.

Figure 3:
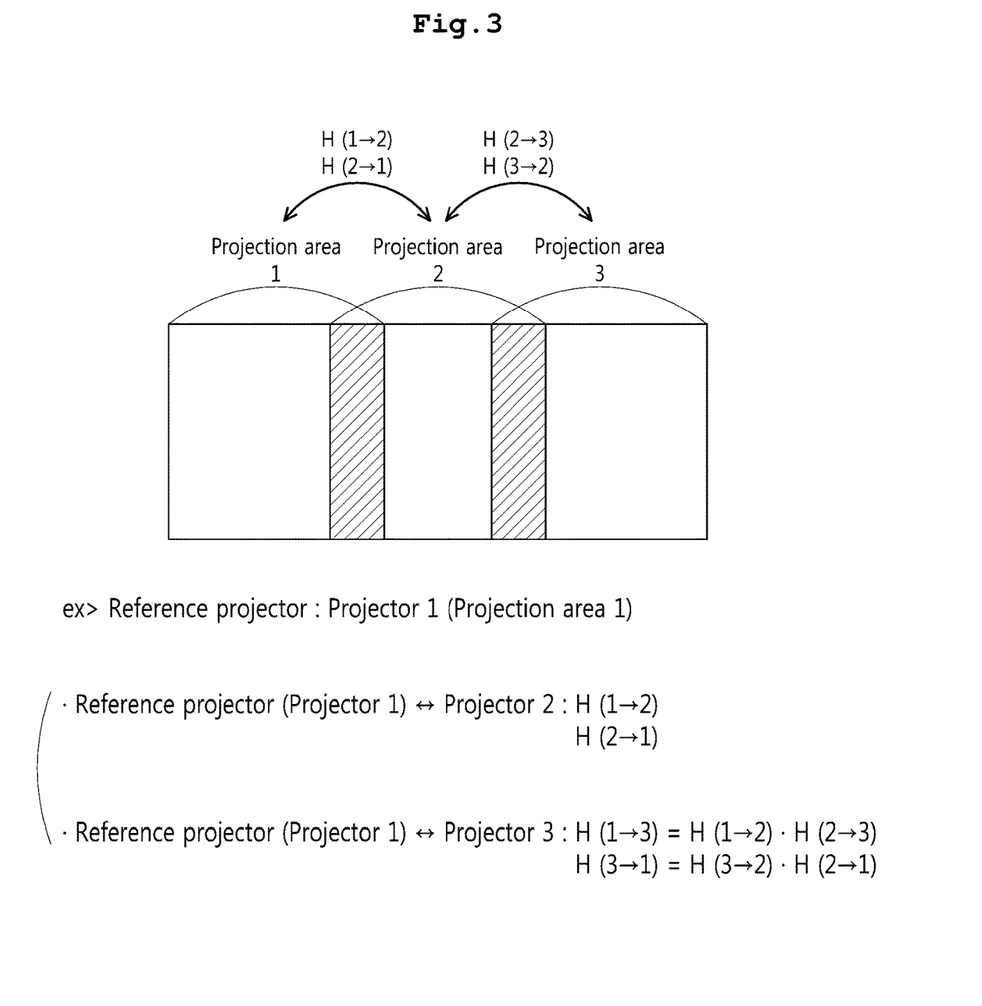
FIG. 3 is a view showing an example of relative transformation information among a plurality of projectors.

Although projector 1 is set as a reference projector in FIG. 3 for convenience, projector 2 or 3 can be set as a reference projector in other embodiments.

Step S13 is a step of calculating relative transformation information between the reference projector set at step S12 and the other projectors.

Here, the relative transformation information is information for transforming the projection area of a first projector to the projection area of a second projector or the projection area of the second projector to the projection area of the first projector, and, preferably, it can be expressed in the form of a homography matrix. For example, H(1->2) is a homography matrix, which means transformation information for transforming the projection area of the first projector to the projection area of the second projector, and H(2->1) a homography matrix, which means transformation information for transforming the projection area of the second projector to the projection area of the first projector.

Such homography matrix information can be calculated based on the point correspondence information of the overlapped projection areas as is briefly described above. Specifically, the homography matrix information can be calculated based on four or more pieces of point correspondence information of the overlapped projection areas preferably formed in a rectangular shape. For example, when the projection area of the first projector and the projection area of the second projector are overlapped, homography matrix information between the first projector and the second projector can be calculated based on the four or more pieces of point correspondence information (correspondence information between four or more points belonging to the projection area of the first projector and four or more points belonging to the projection area of the second projector=point correspondence information of four or more sets).

As a result, step S13 is a step of calculating homography matrix information between the projection area of the reference projector set at step S12 and the projection areas of the other projectors.

Meanwhile, in the case of projectors directly adjacent to the reference projector, the homography matrix information can be directly calculated from the relation with the reference projector. However, in the case of projectors not adjacent to the reference projector, since direct point correspondence information cannot be calculated from the relation with the reference projector, the homography matrix information should be calculated indirectly.

Accordingly, step S13 may include, as detailed steps, step S13-1 of setting relative transformation information of adjacent projectors and step s13-2 of calculating relative transformation information between the reference projector and the other projectors based on the information set at step S13-1.

Step S13-1 is a step of calculating relative transformation information of adjacent projectors. Referring to FIG. 3, step S13-1 is a step of calculating relative homography matrix information 'H(1->2) or H(2->1)' between 'projector 1 and projector 2' arranged to be adjacent to each other and relative homography matrix information 'H(2->3) or H(3->2)' between 'projector 2 and projector 3'.

Step S13-2 is a step of calculating relative transformation information between the reference projector and the other projectors based on the relative transformation information between the adjacent projectors calculated at step S13-1. In this case, although the projectors arranged to be adjacent to the reference projector may use a result calculated at step S13-1, the projectors arranged not to be adjacent to the reference projector should indirectly calculate homography matrix information based on the result calculated at step S13-1. Referring to FIG. 3, although homography matrix information between the reference projector (projector 1) and projector 2 arranged to be adjacent to the reference projector can be directly acquired through a result (H(1->2), H(2->1)) calculated at step S13-1, homography matrix information between the reference projector (projector 1) and projector 3 can be acquired through an additional calculation performed based on a result of step S13-1. For example, the homography matrix information can be acquired as shown below by multiplying the homography matrixes calculated at step S13-1.

$$H(1\text{->}3)=H(1\text{->}2)*H(2\text{->}3)$$

$$H(3\text{->}1)=H(3\text{->}2)*H(2\text{->}1)$$

The projector clustering method according to an embodiment of the present invention may collectively manage a plurality of clustered projectors based on the 'transformation information between the reference projector and the other projectors'.

For example, if only representative image information (image area allocation information or the like) of the reference projector is created, the present invention may collectively create image information of the other projectors using the representative image information and the 'transformation information between the reference projector and the other projectors'. In addition, the present invention may perform an image correction operation such as an edge-blending correction, an offset correction, a warping correction, a corner pin correction or the like by the unit of cluster based on the 'transformation information between the reference projector and the other projectors'.

Accordingly, the present invention may efficiently manage a plurality of projectors although independent information is not created for each projector.

Meanwhile, referring to FIG. 1, the projector clustering method according to an embodiment of the present invention may further include, after step S13, the steps of calculating relative transformation information between the reference projector and an image area S14 and calculating relative transformation information between the image area and the other projectors based on the relative transformation information between the reference projector and the other projectors and the relative transformation information between the reference projector and the image area S15.

Steps S14 and S15 described above are an example of allocating an image area to a plurality of clustered projectors based on the transformation information between the reference projector and the other projectors'.

Step S14 is a step of calculating relative transformation information between the reference projector and the image area. That is, step S14 is a step of setting a relative relation between the reference projector representing a cluster and an image area.

Step S14 can be performed through a process of corresponding four or more points on the image area (preferably, four vertexes of the image area) to four or more points on the projection area of the reference projector and a process of calculating a homography matrix based on point correspondence information.

Figure 4:
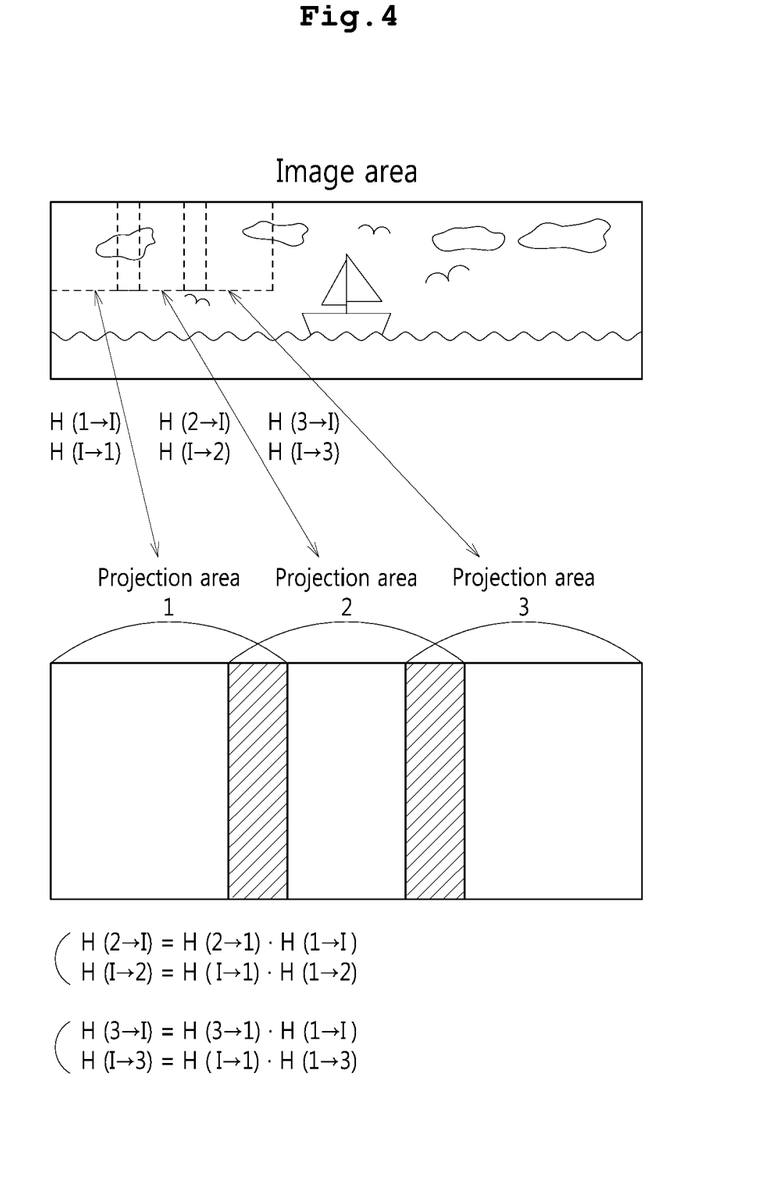
FIG. 4 is a view showing an example of relative transformation information between a plurality of projectors and an image area.

Describing with reference to FIG. 4, it can be confirmed that relative transformation information between the reference projector (projector 1) and the image area (H(1->I), H(I->1)) has been calculated. Here, H(1->I) means a homography matrix for corresponding the projection area of the reference projector (projection area 1) to the image area, and H(I->1) means a homography matrix for corresponding the image area to the projection area of the reference projector.

Step S15 is a step of calculating the 'relative transformation information between the image area and the other projectors' based on the 'relative transformation information between the reference projector and the other projectors' and the 'relative transformation information between the reference projector and the image area' calculated at step S14.

Specifically, step S15 is a step of calculating 'homography matrixes between an image area and the other projectors' by multiplying 'homography matrixes between the reference projector and the other projectors' and a 'homography matrix between the reference projector and the image area'.

Describing with reference to FIG. 4, the relative transformation information between the image area and the other projectors can be calculated as shown below.

$$H(2\text{->}I)=H(2\text{->}1)*H(1\text{->}I)$$

$$H(I\text{->}2)=H(I\text{->}1)*H(1\text{->}2)$$

First, the 'homography matrix between the image area and projector 2' can be calculated based on information on the 'homography matrix between the reference projector and projector 2' and the 'homography matrix between the reference projector and the image area'.

$$H(3\text{->}I)=H(3\text{->}1)*H(1\text{->}I)$$

$$H(I\text{->}3)=H(I\text{->}1)*H(1\text{->}3)$$

In addition, the 'homography matrix between the image area and projector 3' can be calculated based on information on the 'homography matrix between the reference projector and projector 3' and the 'homography matrix between the reference projector and the image area'.

As a result, although image areas of a plurality of projectors are not set one by one, the present invention may collectively manage the image areas of the plurality of projectors based on the 'relative transformation information between the reference projector and the other projectors' and the 'relative transformation information between the reference projector and the image area'.

Meanwhile, if relative transformation information between a specific projector and an image area is calculated by step S15, a correspondence relation between a pixel included in the projection area of the specific projector and a pixel included in the image area can be calculated based on the calculated information.

Specifically, a correspondence relation between pixels can be calculated based on the homography matrix information between the specific projector and the image area calculated at step S15.

Figure 5:
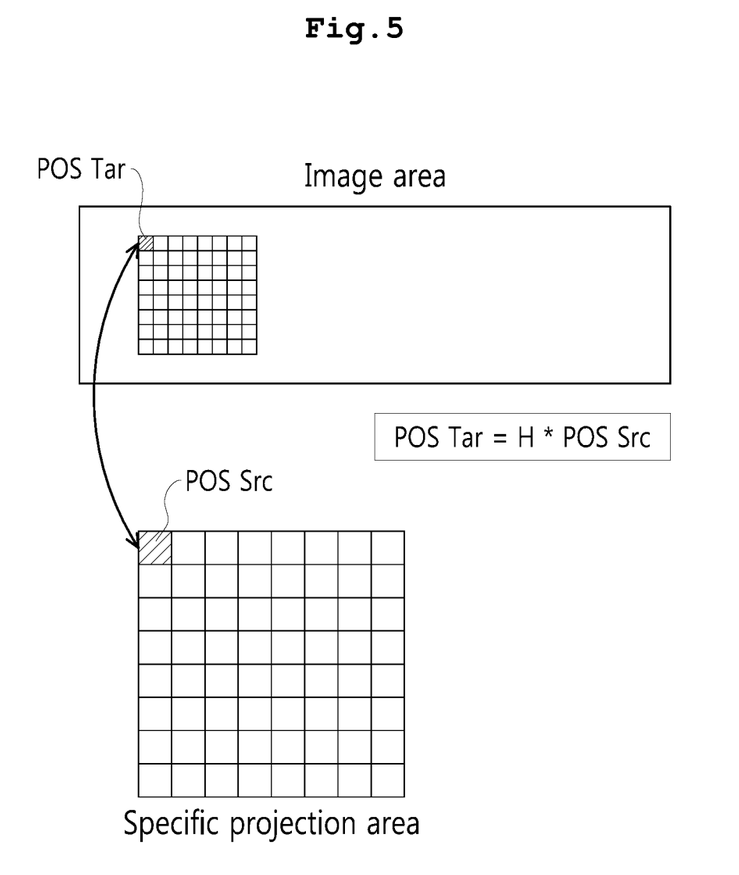
FIG. 5 is a view showing an example of a correspondence relation between a pixel included in a projection area of a specific projector and a pixel included in an image area.

Describing with reference to FIG. 5, each pixel (POS Src) included in the projection area of the specific projector and each pixel (POS Tar) included in the image area can be expressed as a correspondence relation shown below.

$$POS\ Tar = H * POS\ Src$$

(H denotes a homography matrix between the specific projector and the image area)

Meanwhile, as described above, a projection area of a specific projector can be formed in a shape other than a rectangle, and, in this case, it is not easy to specify positions of pixels included in a corresponding projection area. Accordingly, in this case, it is preferable to express positions of pixels based on a set reference area of a rectangular shape after setting the reference area.

Figure 6:
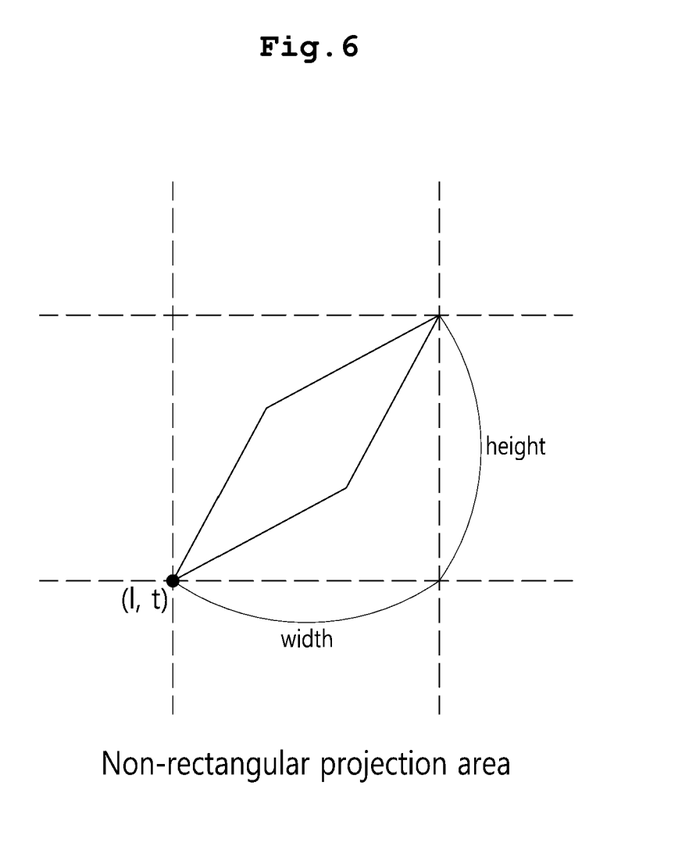
FIG. 6 is a view showing an example of a method of specifying a pixel position in a non-rectangular projection area.

For example, when a projection area of a specific projector is not in a rectangular shape as shown in FIG. 6, a reference area of a rectangular shape can be set based on information on a maximum value and a minimum value of the projection area, and positions of pixels included in the projection area can be expressed based on the set reference area. In this case, the reference area can be defined by horizontal start position information 1, vertical start position information t, horizontal width information width and vertical width information height, and a position of each pixel can be expressed based on the information. In addition, position information of each pixel can be expressed in a normalized form preferably in a range between 0 and 1. Specifically, a position of a specific pixel can be expressed as (u, v) which is normalized to a value between 0 and 1, and the normalized values can be restored to original values (V, Y) by the mathematical expressions shown below.

$$X = u * width + 1$$

$$Y = v * height + t$$

Meanwhile, pixel information (u, v) of a specific projector corresponding to a pixel of an area of a specific image can be stored through Red (R), Green (G), Blue B ( ) and Alpha (A) channels. In this case, in order to store u and v values in an 8-bit image (0 to 255), the u value can be stored in the R and G channels, and the v value can be stored in the B and A channels.

$$R = (int)(u * 255 * 255)/255$$

$$B = (int)(v * 255 * 255)/255$$

$$G = (u * 255 * 255) \% 255$$

$$A = (v * 255 * 255) \% 255$$

In addition, u and v values can be restored later by the mathematical expressions shown below.

$$u = (R * 255 + G)/(255 * 255)$$

$$v = (B * 255 + A)/(255 * 255)$$

Meanwhile, the projector clustering method according to an embodiment of the present invention described above can be utilized in the process of managing projectors of a so-called 'multi-projection system', in which a plurality of projection surfaces is arranged around the seats of audience. Specifically, the present can be utilized in the process of clustering a plurality of projectors of a multi-projection system for each projection surface.

For example, the present invention can be utilized in the process of clustering a plurality of projectors of a multi-projection system into cluster A which projects an image on the left side projection surface together, cluster B which projects an image on the front side projection surface together, cluster C which projects an image on the right side projection surface together, cluster D which projects an image on the ceiling projection surface together, and cluster E which projects an image on the bottom projection surface together, and the plurality of projectors included in the multi-projection system can be very efficiently managed in this method.

Meanwhile, after being implemented in the form of a program, the projector clustering method can be stored in a recoding medium that can be read by an electronic device or supplied through a program supply server. In addition, the projector clustering method can be temporarily or permanently stored in a variety of electronic devices after being implemented in the form of a program.

Hereinafter, a projector management system according to an embodiment of the present invention will be described with reference to FIGS. 7 to 9.

The projector management system which will be described below is an exemplary system which implements the 'projector clustering method' described above. Accordingly, although its category is different, the features described above in relation to the 'projector clustering method' may be naturally inferred and applied to the projector management system described below.

In addition, the 'projector clustering method' can be implemented through a variety of systems other than the system described below.

Figure 7:
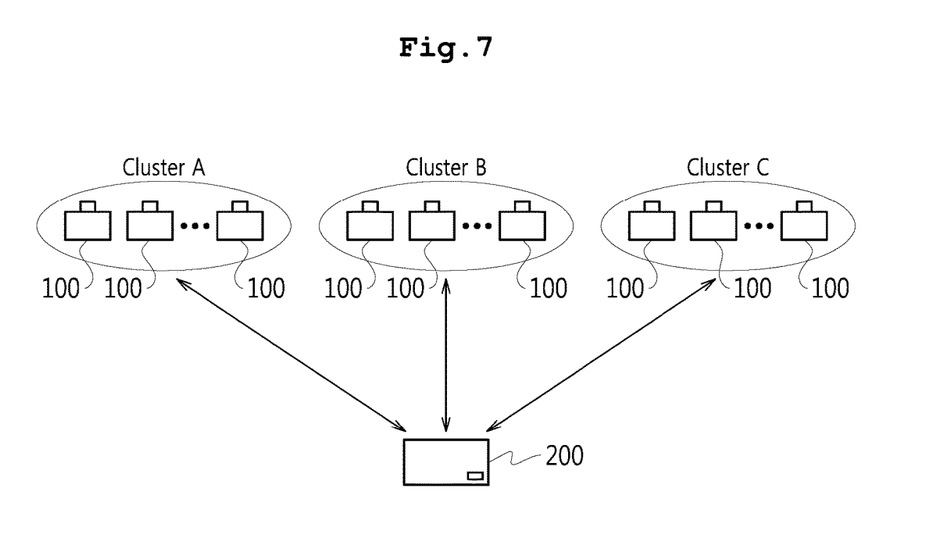
FIGS. 7 and 8 are views showing the configuration of a projector management system according to an embodiment of the present invention.
Figure 8:
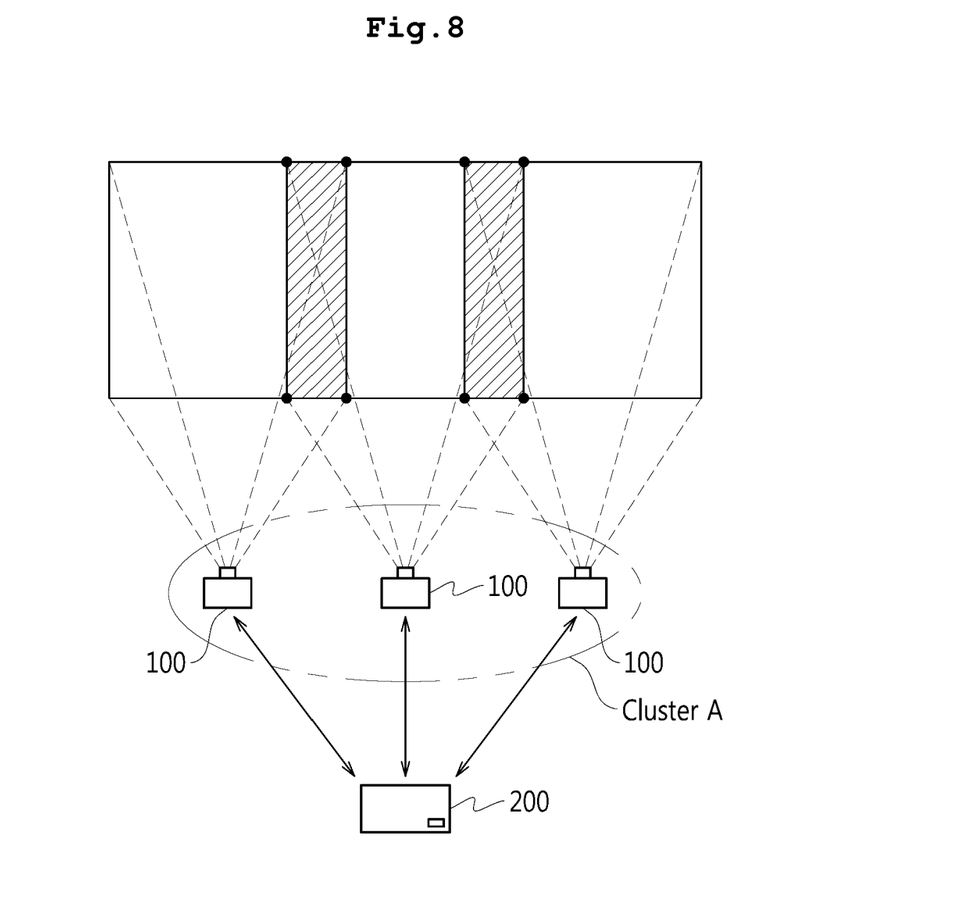

Referring to FIGS. 7 and 8, a projector management system according to an embodiment of the present invention may include two or more projector clusters and a management device 200 for controlling and managing operation of the two or more projector clusters.

The two or more projector clusters are a configuration formed by grouping a plurality of projectors 100 installed in a theater. Here, each projector cluster may include a plurality of projectors 100 in each cluster.

Although the process of grouping a plurality of projectors 100 installed in a theater can be performed in a variety of ways, preferably, the projectors can be grouped based on information on the projection surfaces formed in the theater. For example, if the theater is a multi-projection theater including a plurality of projection surfaces and 'a front side projection surface, a left side projection surface, a right side projection surface, a ceiling projection surface and a bottom projection surface' are formed in the theater, the plurality of projectors 100 installed in the theater can be grouped in 'a cluster which projects an image on the front side projection surface, a cluster which projects an image on the left side projection surface, a cluster which projects an image on the right side projection surface, a cluster which projects an image on the ceiling projection surface, and a cluster which projects an image on the bottom projection surface'. That is, a plurality of projectors 100 projecting an image on a specific projection surface together can be grouped as a cluster.

FIG. 7 shows an example of grouping a plurality of projectors 100 installed in a theater into three clusters (Cluster A, Cluster B and Cluster C). In this case, although the three clusters can be formed in a variety of ways, preferably, they can be formed based on information on the projection surfaces formed in a theater as described above. For example, Cluster A is formed by grouping projectors 100 projecting an image on the left side projection surface, Cluster B is formed by grouping projectors 100 projecting an image on the front side projection surface, and Cluster C is formed by grouping projectors 100 projecting an image on the right side projection surface.

The management device 200 is a configuration for controlling and managing the two or more projector clusters. Specifically, the management device 200 is a configuration which can control a plurality of projectors 100 installed in a theater by the unit of cluster or individually control each of the projectors 100.

In this case, the management device 200 may apply the 'projector clustering method' described above with reference to FIG. 8 to each of the projector clusters and may individually control each projector cluster or collectively control two or more projector clusters.

Meanwhile, the management device 200 can be implemented in the form of a variety of electronic devices, and the management device 200 can be implemented in a single electronic device or in a form interconnecting various electronic devices. For example, the management device 200 can be implemented in a form including a server or in a form interconnecting two or more servers. In addition, the management device 200 can be implemented in a form interconnecting a server and other electronic devices or implemented by electronic devices other than the server. In addition, the management device 200 can be implemented in a form including an input device and an output device as a user interface.

Hereinafter, examples of configurations which can be included in the management device 200 will be described with reference to FIG. 9.

Figure 9:
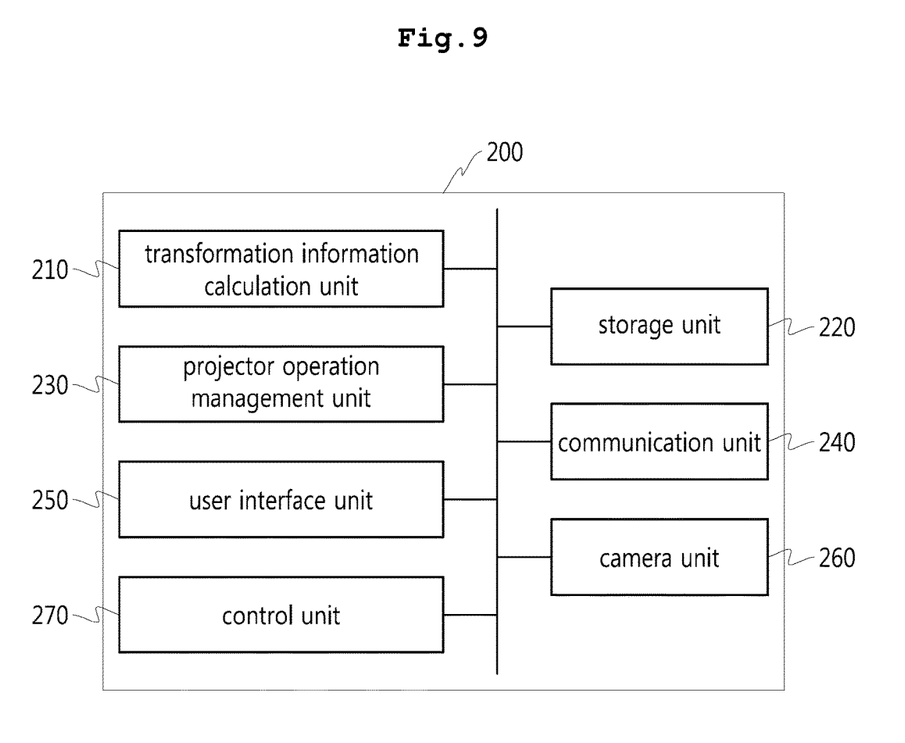
FIG. 9 is a view showing the configuration of a management device according to an embodiment of the present invention.

Referring to FIG. 9, the management device 200 may include configurations such as a transformation information calculation unit 210, a storage unit 220, a projector operation management unit 230, a communication unit 240, a user interface unit 250, a camera unit 260 and a control unit 270, and the management device 200 may include, other than these configurations, various configurations for managing projector clusters.

The transformation information calculation unit 210 is a configuration for calculating and managing transformation information of the projectors 100 by the cluster for the two or more projector clusters.

The transformation information calculation unit 210 may calculate relative transformation information between a reference projector and the other projectors of each cluster, while the projection areas of a plurality of projectors 100 included in each cluster are overlapped.

In addition, the transformation information calculation unit 210 may calculate transformation information for each cluster, while the projection areas of the projectors included in each cluster are overlapped in the form of a rectangular shape.

In addition, the transformation information calculation unit 210 may calculate relative transformation information between the reference projector of each cluster and the image area. For example, when Cluster A, Cluster B and Cluster C are formed in a theater, the transformation information calculation unit 210 may calculate homography matrix information between the reference projector of each cluster and the image area.

In addition, the transformation information calculation unit 210 may calculate relative transformation information between the other projectors of each cluster and the image area based on the relative transformation information between the reference projector and the other projectors of each cluster and the relative transformation information between the reference projector of each cluster and the image area. For example, the transformation information calculation unit 210 may calculate homography matrix information between the other projectors of Cluster A and the image area based on homography matrix information between the reference projector of Cluster A and the other projectors of Cluster A and homography matrix information between the reference projector of Cluster A and the image area. In addition, the transformation information calculation unit 210 may calculate homography matrix information for Cluster B and Cluster C in the same manner.

The storage unit 220 is a configuration for storing various kinds of information related to the projector management system according to the present invention. Particularly, the storage unit 220 may store the transformation information created by the transformation information calculation unit 210 and create a database (DB) of the transformation information. In this case, the storage unit 220 may create a DB of transformation information by assigning an identifier to each cluster and create a DB of transformation information by assigning an identifier to each individual projector included in each cluster.

Meanwhile, the storage unit 220 temporarily or permanently store the various data described above and may be configured in a form including various types of memory elements.

The projector operation management unit 230 is a configuration for controlling operation of a plurality of projectors included in the two or more projector clusters. Specifically, the projector operation management unit 230 is a configuration for adjusting a lens, a body and the like of each projector installed in a theater and controlling direction of projection of each projector through the adjustment.

As described above, in order for the transformation information calculation unit 210 to calculate the relative transformation information for each cluster, projection areas of the projectors included in each cluster should be arranged to be overlapped with each other (projection areas of adjacent projectors should be arranged to be overlapped preferably in a rectangular shape), and the arrangement state can be controlled through the operation of the projector operation management unit 230.

Meanwhile, the projector operation management unit 230 may control the projectors included in each cluster based on various kinds of information. For example, the projector operation management unit 230 may control operation of the projectors based on the information input through the user interface unit 250, information created by the camera unit 260, information transferred through the communication unit 240 and the like. In addition, the projector operation management unit 230 may control direction of projection of the projectors compositely considering the information and further enhance accuracy of the control through the operation.

The communication unit 240 is a configuration for transmitting and receiving various kinds of information related to operation of the system. The management device 200 may wiredly or wirelessly connect to a plurality of projectors installed in a theater, a plurality of projection equipment, a user terminal, an external server and the like through the communication unit 240 and may transmit and receive various kinds of information needed for operation of the system.

Meanwhile, the communication unit 240 may include various kinds of wired or wireless transceiver modules and may transmit and receive data through a wired or wireless communication network of a variety of communication specifications.

The user interface unit 250 is a configuration implementing an environment for interfacing with a user. The user interface unit 250 may include various input devices, display devices, voice output device and the like and may receive base information used for system control from a user or provide various kinds information related to the system.

Meanwhile, when the projector operation management unit 230 controls operation of the projectors based on the information input through the user interface, the user interface unit 250 may implement various visual functions which may help identification of an overlapped projection area. For example, the user interface unit 250 may implement a function of displaying only projection areas of two adjacent projectors forming an overlapped projection area and not displaying projection areas of the other projectors, a function of displaying projection areas of adjacent projectors in different colors (e.g., blue and red), and a function of visually displaying correspondence points of the overlapped projection area.

The camera unit 260 installed in a theater is a configuration for sensing various kinds of visual information on the inside of the theater or imaging the sensed visual information. The camera unit 260 may include a variety of camera modules.

Particularly, the camera unit 260 may recognize a projection area projected by each projector installed in the theater and may visually recognize an overlapped projection area formed by two or more adjacent projectors. In addition, such information can be transferred to the projector operation management unit 230 and utilized as basic information for controlling operation of the projectors.

The control unit 270 is a configuration for individually or compositely controlling operation of various configurations of the management device 200 including the transformation information calculation unit 210, the storage unit 220, the projector operation management unit 230, the communication unit 240, the user interface unit 250, the camera unit 260 and the control unit 270.

The control unit 270 may include at least one operation means, and, here, although the operation means can be a general-purpose central processing unit (CPU), it also can be a programmable device (CPLD or FPGA), an application specific integrated circuit (ASIC), or a microcontroller chip implemented to be appropriate a specific purpose.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A projector clustering method, comprising the steps of:
    (a) arranging projection areas of a plurality of projectors to partially overlap each other in series;
    (b) setting a reference projector among the plurality of projectors;
    (c) calculating first relative transformation information between adjacent projectors in the plurality of projectors;
    (d) calculating second relative transformation information between the reference projector and other projector based on the calculated first relative transformation information;
    (e) calculating third relative transformation information between the reference projector and an image area to be projected by the plurality of projectors; and
    (f) calculating fourth relative transformation information between the image area and the other projectors based on the second relative transformation information between the reference projector and the other projectors and the third relative transformation information,
    wherein the first and second relative transformation information are calculated for transforming the projection area of one projector to the projection area of another projector in series,
    wherein a correspondence relation between a pixel included in the image area and a pixel included in the projection area of a specific projector is calculated based on relative transformation information between the image area and the specific projector, and
    wherein when the projection area of the specific projector is not in a rectangular shape,
        a reference area of a rectangular shape is set using a maximum value and a minimum value of the projection area of the specific projector, and
        a position of a pixel included in the projection area of the specific projector is expressed based on the set reference area.

2. The method according to claim 1, wherein at step (a), the projection areas of adjacent projectors are partially overlapped in a rectangular shape.

3. The method according to claim 1, wherein the plurality of projectors is a cluster projecting together an image on a projection surface among projection surfaces of a multi-projection theater.

4. A non-transitory computer readable recording medium recording a projector clustering method as a program, the method comprising the steps of:
    (a) arranging projection areas of a plurality of projectors to partially overlap each other in series;
    (b) setting a reference projector among the plurality of projectors; and
    (c) calculating first relative transformation information between adjacent projectors in the plurality of projectors;
    (d) calculating second relative transformation information between the reference projector and other projector based on the calculated first relative transformation information;
    (e) calculating third relative transformation information between the reference projector and an image area to be projected by the plurality of projectors; and
    (f) calculating fourth relative transformation information between the image area and the other projectors based on the second relative transformation information between the reference projector and the other projectors and the third relative transformation information,
    wherein the first and second relative transformation information are calculated for transforming the projection area of one projector to the projection area of another projector in series,
    wherein a correspondence relation between a pixel included in the image area and a pixel included in the projection area of a specific projector is calculated based on relative transformation information between the image area and the specific projector, and wherein when the projection area of the specific projector is not in a rectangular shape,
a reference area of a rectangular shape is set using a maximum value and a minimum value of the projection area of the specific projector, and
a position of a pixel included in the projection area of the specific projector is expressed based on the set reference area.

5. A management device for clustering and managing a plurality of projectors, the device comprising:
a projector operation management unit configured to arrange projection areas of the plurality of projectors to partially overlap each other in series;
a transformation information calculation unit configured to
set a reference projector among the plurality of projectors,
calculate first relative transformation information between adjacent projectors in the plurality of projector,
calculate second relative transformation information between the reference projector and other projector based on the calculated first relative transformation information,
calculate third relative transformation information between the reference projector and an image area to be projected by the plurality of projectors, and
calculate fourth relative transformation information between the image area and the other projectors based on the second relative transformation information between the reference projector and the other projectors and the third relative transformation information; and
a storage unit configured to store the calculated first and second relative transformation information,
wherein the first and second relative transformation information are calculated for transforming the projection area of one projector to the projection area of another projector in series,
wherein a correspondence relation between a pixel included in the image area and a pixel included in the projection area of a specific projector is calculated based on relative transformation information between the image area and the specific projector, and
wherein when the projection area of the specific projector is not in a rectangular shape,
a reference area of a rectangular shape is set using a maximum value and a minimum value of the projection area of the specific projector, and
a position of a pixel included in the projection area of the specific projector is expressed based on the set reference area.

6. The device according to claim 5, wherein the transformation information calculation unit is configured to calculate the relative transformation information while projection areas of adjacent projectors in the plurality of projectors are partially overlapped in a rectangular shape.

7. The device according to claim 5, wherein the plurality of projectors is a cluster projecting together an image on a projection surface among projection surfaces of a multi-projection theater.

8. A projector management system, the system comprising:
a plurality of projectors configured to project together an image on a projection surface; and
a management device configured to
arrange projection areas of the plurality of projectors to partially overlap each other in series,
set a reference projector among the plurality of projectors,
calculate first relative transformation information between adjacent projectors in the plurality of projectors, and
calculate second relative transformation information between the reference projector and other projector based on the calculated first relative transformation information,
calculate third relative transformation information between the reference projector and an image area to be projected by the plurality of projectors, and
calculate fourth relative transformation information between the image area and the other projectors based on the second relative transformation information between the reference projector and the other projectors and the third relative transformation information,
wherein the first and second relative transformation information are calculated for transforming the projection area of one projector to the projection area of another projector in series,
wherein a correspondence relation between a pixel included in the image area and a pixel included in the projection area of a specific projector is calculated based on relative transformation information between the image area and the specific projector, and
wherein when the projection area of the specific projector is not in a rectangular shape,
a reference area of a rectangular shape is set using a maximum value and a minimum value of the projection area of the specific projector, and
a position of a pixel included in the projection area of the specific projector is expressed based on the set reference area.

9. The method according to claim 1, wherein the relative transformation information is calculated based on information on the overlapped projection areas.

10. The device according to claim 5, wherein the relative transformation information is calculated based on information on the overlapped projection areas.

11. The system according to claim 8, wherein the relative transformation information is calculated based on information on the overlapped projection areas.

* * * * *